(12) United States Patent
Mahjourian et al.

(10) Patent No.: US 11,926,347 B2
(45) Date of Patent: Mar. 12, 2024

(54) CONDITIONAL AGENT TRAJECTORY PREDICTION

(71) Applicant: Waymo LLC, Mountain View, CA (US)

(72) Inventors: Reza Mahjourian, Austin, TX (US); Carlton Macdonald Downey, Mountain View, CA (US); Benjamin Sapp, Marina del Rey, CA (US); Dragomir Anguelov, San Francisco, CA (US); Ekaterina Igorevna Tolstaya, Voorhees, NJ (US)

(73) Assignee: Waymo LLC, Mountain View, CA (US)

( * ) Notice: Subject to any disclaimer, the term of this patent is extended or adjusted under 35 U.S.C. 154(b) by 312 days.

(21) Appl. No.: 17/514,259

(22) Filed: Oct. 29, 2021

(65) Prior Publication Data
US 2022/0135086 A1    May 5, 2022

Related U.S. Application Data

(60) Provisional application No. 63/108,249, filed on Oct. 30, 2020.

(51) Int. Cl.
*B60W 60/00* (2020.01)
*G06N 3/045* (2023.01)

(52) U.S. Cl.
CPC ............ *B60W 60/00272* (2020.02); *B60W 60/00274* (2020.02); *G06N 3/045* (2023.01)

(58) Field of Classification Search
CPC ...... B60W 60/00272; B60W 60/00274; G06N 3/045; G06N 3/044; G06N 3/006; G06N 7/01
See application file for complete search history.

(56) References Cited

U.S. PATENT DOCUMENTS

2020/0089246 A1\* 3/2020 McGill, Jr. .......... G05D 1/0214
2020/0150672 A1\* 5/2020 Naghshvar ............ G06N 3/006
(Continued)

OTHER PUBLICATIONS

Alahi et al., "Social LSTM: Human Trajectory Prediction in Crowded Spaces," Proceedings of the IEEE Conference on Computer Vision and Pattern Recognition, 2016, pp. 961-971.
(Continued)

*Primary Examiner* — Behrang Badii
(74) *Attorney, Agent, or Firm* — Fish & Richardson P.C.

(57) ABSTRACT

Methods, computer systems, and apparatus, including computer programs encoded on computer storage media, for performing a conditional behavior prediction for one or more agents. The system obtains context data characterizing an environment. The context data includes data characterizing a plurality of agents, including a query agent and one or more target agents, in the environment at a current time point. The system further obtains data identifying a planned future trajectory for the query agent after the current time point, and for each target agent in the set, processes the context data and the data identifying the planned future trajectory using a first neural network to generate a conditional trajectory prediction output that defines a conditional probability distribution over possible future trajectories of the target agent after the current time point given that the query agent follows the planned future trajectory for the query agent after the current time point.

20 Claims, 4 Drawing Sheets

(56) References Cited

U.S. PATENT DOCUMENTS

| | | | |
|---|---|---|---|
| 2021/0001897 A1* | 1/2021 | Chai | G08G 1/0129 |
| 2021/0073594 A1* | 3/2021 | Wierstra | G06V 30/242 |
| 2021/0150350 A1* | 5/2021 | Gao | G06N 3/048 |

OTHER PUBLICATIONS

Bajcsy et al., "A robust control framework for human motion prediction," IEEE Robotics and Automation Letters, Nov. 2018, 8 pages.

Bajcsy et al., "A scalable framework for real-time multi-robot, multi-human collision avoidance," 2019 International Conference on Robotics and Automation, May 2019, pp. 936-943.

Casas et al., "Intentnet: Learning to predict intention from raw sensor data," Proceedings of The 2nd Conference on Robot Learning, 2018, 87:947-956.

Casas et al., "Spatially-aware graph neural networks for relational behavior forecasting from sensor data," CoRR, Oct. 2019, arXiv:1910.08233, 11 pages.

Chai et al., "Multipath: Multiple probabilistic anchor trajectory hypotheses for behavior prediction," CoRR, Oct. 2019, arxiv.org/abs/1910.05449, 14 pages.

Fisac et al., "Probabilistically safe robot planning with confidence-based human predictions," CoRR, May 2018, arXiv:1806.00109, 9 pages.

Gao et al., "VectorNet: Encoding hd maps and agent dynamics from vectorized representation," Proceedings of the IEEE/CVF Conference on Computer Vision and Pattern Recognition, 2020, pp. 11525-11533.

Gupta et al., "Social GAN: Socially acceptable trajectories with generative adversarial networks," Proceedings of the IEEE Conference on Computer Vision and Pattern Recognition, 2018, pp. 2255-2264.

Hershey et al., "Approximating the kullback leibler divergence between gaussian mixture models," 2007 IEEE International Conference on Acoustics, Speech and Signal Processing—ICASSP '07, Apr. 2007, 4 pages.

Jaques et al., "Intrinsic social motivation via causal influence in multi-agent RL," ICLR, 2019, 20 pages.

Khandelwal et al., "What-if motion prediction for autonomous driving," CoRR, Aug. 2020, arXiv:2008.10587, 16 pages.

Lee et al., "DESIRE: Distant future prediction in dynamic scenes with interacting agents," Proceedings of the IEEE Conference on Computer Vision and Pattern Recognition, 2017, pp. 336-345.

Mangalam et al., "It is not the journey but the destination: Endpoint conditioned trajectory prediction," European Conference on Computer Vision, Nov. 2020, 19 pages.

Michelmore et al., "Evaluating uncertainty quantification in end-to-end autonomous driving control," CoRR, Nov. 2018, arXiv:1811.06817, 7 pages.

Pandey et al., "A framework towards a socially aware mobile robot motion in human-centered dynamic environment," 2010 IEEE/RSJ International Conference on Intelligent Robots and Systems, Oct. 2010, 9 pages.

Refaat et al., "Agent prioritization for autonomous navigation," CoRR, Sep. 2019, arXiv:1909.08792, 8 pages.

Rhinehart et al., "Precog: Prediction conditioned on goals in visual multi-agent settings," Proceedings of the IEEE International Conference on Computer Vision, 2019, pp. 2821-2830.

Sadigh et al., "Planning for autonomous cars that leverage effects on human actions," Robotics: Science and Systems, 2016, 2:9 pages.

Salzmann et al., "Trajectron++: Dynamically-Feasible Trajectory Forecasting With Heterogeneous Data," CoRR, Jan. 2020, arxiv.org/abs/2001.03093, 23 pages.

Scandolo et al., "An anthropomorphic navigation scheme for dynamic scenarios," 2011 IEEE International Conference on Robotics and Automation, May 2011, pp. 809-814.

Shannon, "A mathematical theory of communication," The Bell System Technical Journal, Jul. 1948, 27(3):379-423.

Sisbot et al., "A human aware mobile robot motion planner," IEEE Transactions on Robotics, Oct. 2007, 23(5):874-883.

Tang et al., "Multiple futures prediction," Advances in Neural Information Processing Systems, 2019, 15:424-434.

Vaswani et al., "Attention is all you need," Advances in Neural Information Processing Systems 30, 2017, 11 pages.

Zeng et al., "End-to-end interpretable neural motion planner," Proceedings of the IEEE/CVF Conference on Computer Vision and Pattern Recognition, 2019, pp. 8660-8669.

Ziebart et al., "Planning-based prediction for pedestrians," 2009 IEEE/RSJ International Conference on Intelligent Robots and Systems, Oct. 2009, 6 pages.

* cited by examiner

CONDITIONAL AGENT TRAJECTORY PREDICTION

CROSS-REFERENCE TO RELATED APPLICATION

This application claims priority to U.S. Provisional Patent Application No. 63/108,249, filed on Oct. 30, 2020, the disclosure of which is hereby incorporated by reference in its entirety.

BACKGROUND

This specification relates to predicting the future trajectory of an agent in an environment.

The environment may be a real-world environment, and the agent may be, e.g., a vehicle in the environment. Predicting the future trajectories of agents is a task required for motion planning, e.g., by an autonomous vehicle.

Autonomous vehicles include self-driving cars, boats, and aircraft. Autonomous vehicles use a variety of onboard sensors and computer systems to detect nearby objects and use such detections to make control and navigation decisions.

Some autonomous vehicles have onboard computer systems that implement neural networks, other types of machine learning models, or both for various prediction tasks, e.g., object classification within images. For example, a neural network can be used to determine that an image captured by an onboard camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on the input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification describes a system implemented as computer programs on one or more computers in one or more locations that generates a conditional trajectory prediction for a target agent, e.g., a vehicle, a cyclist, or a pedestrian, in an environment. The trajectory prediction is referred to as a "conditional" trajectory prediction because the system makes the prediction conditioned on a planned future trajectory for a query agent in the environment. In other words, the conditional trajectory prediction for the target agent is a prediction of the future trajectory of the target agent starting from a current time point given that or, in other words, assuming that the query agent will follow the planned future trajectory starting from the current time point.

Each conditional behavior prediction generated by the system defines a conditional probability distribution over a space of possible future trajectories for the target agent given that the query agent follows the planned future trajectory for the query agent starting from the current time point.

In some implementations, the system also generates a marginal probability distribution over the space of possible future trajectories for the target agent. The prediction of the marginal probability distribution is not conditioned on any planned trajectory for the query agent.

In these implementations, the system can use these two distributions to generate an interactivity score between the target agent and the query agent. When the environment includes multiple target agents, the system can generate a respective interactivity score between the query agent and each of the target agents.

The subject matter described in this specification can be implemented in particular implementations so as to realize one or more advantages.

When controlling an agent in an environment in which the agent potentially interacts with other agents, it is important to accurately model the reactions of other agents in the environment. For example, interactive driving scenarios, such as lane changes, merges, and unprotected turns, are challenging situations for autonomous driving. Planning in interactive scenarios requires accurately modeling the reactions of other agents, e.g., vehicles, cyclists, or pedestrians, in the environment according to different future actions of the autonomous vehicle to be controlled (i.e., the query agent).

The techniques described in this specification provide models for conditional trajectory prediction of the other agents that take as an input a query future trajectory for the query agent, and predict distributions over future trajectories for other agents conditioned on the query. Leveraging such models, the system can provide an agent interactivity score that characterizes the degree to which the query agent's behavior changes the predicted distribution of the corresponding target agent, and thus allowing identifying significant interactive scenarios for training and evaluating behavior prediction models. In real-world autonomous driving, the interactivity score can be used to anticipate driver interactions. When processing data offline, the interactivity scores can be used to mine interactive scenarios, for example, by identifying and focusing on scenarios having high interactivity scores.

Further, the interactivity scores are effective for guiding agent prioritization under computational budget constraints. For example, the system can make high-fidelity (and compute-intensive) behavior predictions only for target agents that have high interactivity scores. Because the interactivity scores are representative of likelihoods that the behavior of the query agent (e.g., the autonomous vehicle) will affect the corresponding agents, the system can reduce the amount of computational resources that are consumed by generating behavior predictions for surrounding agents without adversely impacting the quality of the final planned trajectory that is generated using the generated behavior predictions. In fact, in some cases, by causing the system to focus the high-fidelity predictions on only the relevant target agents, the quality of the final planned trajectory can be improved.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
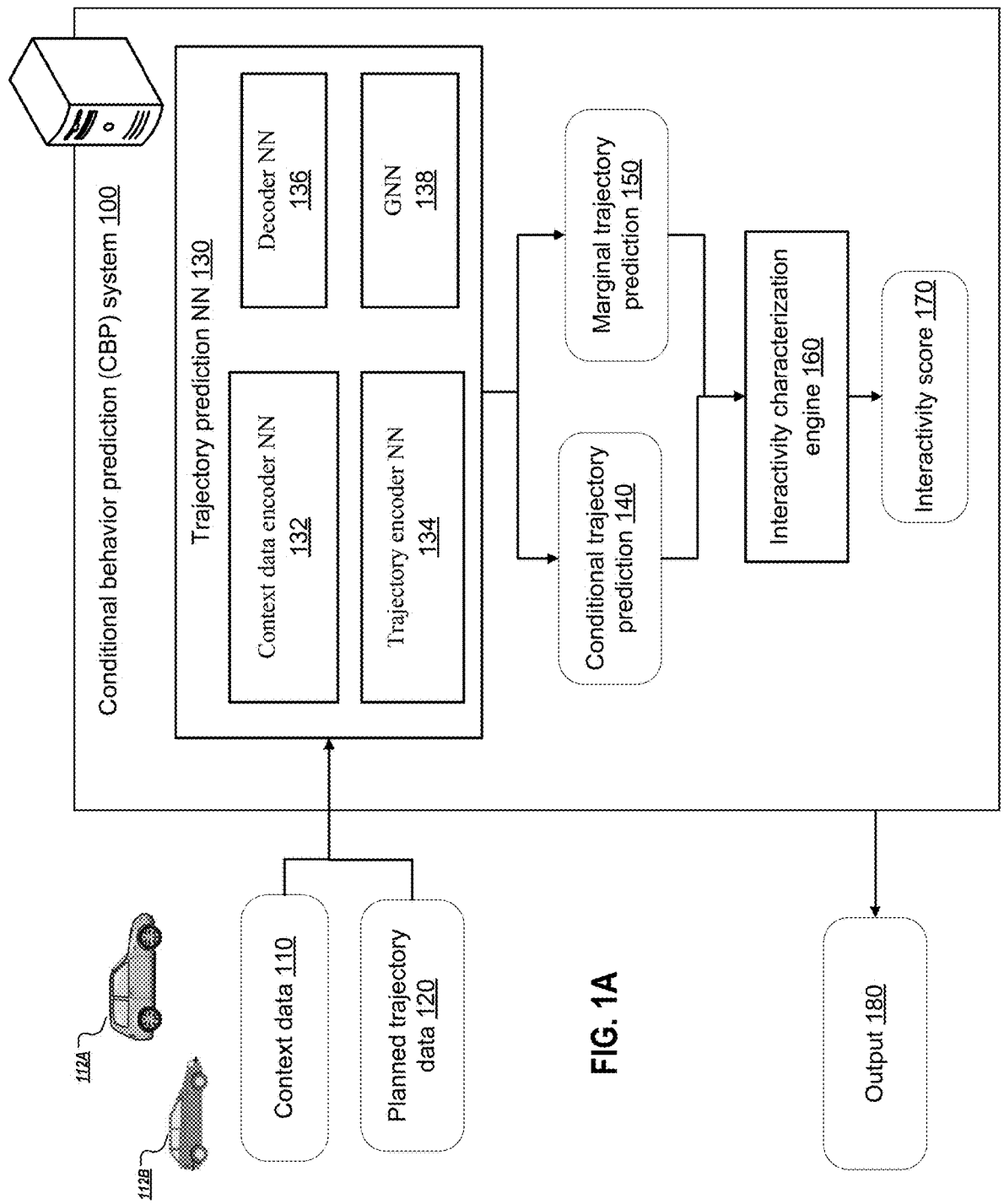
FIG. 1A shows an example conditional behavior prediction system.

FIG. 1A shows an example of a conditional behavior prediction system 100. The system 100 is an example of a system implemented as computer programs on one or more computers in one or more locations, in which the systems, components, and techniques described below can be implemented. For example, the system 100 can be deployed onboard an autonomous vehicle for generating predictions that guide the control of the autonomous vehicle. In an alternative example, the system 100 can be implemented on computers not onboard the autonomous vehicle to perform off-line predictions.

In general, the system 100 obtains context data 110 characterizing an environment. The context data includes data characterizing a plurality of agents, including a query agent 112A and one or more target agents 112B, in the environment at a current time point. In particular, the context data includes data characterizing trajectories of each of the plurality of agents up to the current time point.

The system 100 further obtains planned trajectory data 120 identifying a planned future trajectory for the query agent 112A after the current time point.

For each target agent 112B, the system 100 processes the context data 110 and the planned trajectory data 120 using a trajectory prediction neural network (130) to generate a conditional trajectory prediction 140 that defines a conditional probability distribution over possible future trajectories of the target agent after the current time point given that the query agent follows the planned future trajectory for the query agent after the current time point. The system can generate the output data 180 that includes the conditional trajectory prediction 140 and/or data derived from the conditional trajectory prediction 140.

The trajectory prediction for the target agent 112B is referred to as a "conditional" trajectory prediction because the system 100 makes the prediction conditioned on a planned future trajectory for the query agent 112A in the environment. In other words, the conditional trajectory prediction for the target agent is a prediction of the future trajectory of the target agent 112B starting from a current time point given that or, in other words, assuming that the query agent 112A will follow the planned future trajectory starting from the current time point.

For example, the conditional trajectory prediction may be made by an onboard computer system of an autonomous vehicle navigating through the environment, the query agent 112A may be the autonomous vehicle, and the target agent 112B may be another vehicle, a pedestrian, or a cyclist that has been detected by the sensors of the autonomous vehicle. In these cases, the context data 110 includes data generated from data captured by one or more sensors, such as cameras and/or Lidar sensors, of the autonomous vehicle. The conditional behavior predictions can then be used by the onboard system to control the autonomous vehicle 112A, i.e., to plan the future motion of the vehicle based in part on the likely consequences of one or more planned future trajectories on the motion of other agents in the environment. In particular, the system 100 can modify a future trajectory planned for the autonomous vehicle based on the conditional trajectory prediction, for example, to avoid an undesirable behavior (e.g., an abrupt braking, speeding up, crowding, or a fast turn) predicted for one or more other vehicles in the environment.

As another example, the conditional trajectory prediction may be made in a computer simulation of a real-world environment being navigated through by a simulated autonomous vehicle and the target agent, so that the query agent 112A is the simulated autonomous vehicle and the target agent 112B is another simulated vehicle in the vicinity of the simulated autonomous vehicle in the computer simulation. In this case, the context data includes data generated from data that simulates data that would be captured by one or more sensors of an autonomous vehicle in the real-world environment. Generating the predictions in simulation may assist in controlling the simulated vehicle, in testing the realism of certain situations encountered in the simulation, and in ensuring that the simulation includes surprising interactions that are likely to be encountered in the real world. More generally, generating these predictions in simulation can be part of testing the control software of a real-world autonomous vehicle before the software is deployed onboard the autonomous vehicle, of training one or more machine learning models that will layer be deployed onboard the autonomous vehicle or both.

As used in this specification, a future trajectory for an agent is a sequence that includes a respective agent state for the agent for each of a plurality of future time points, i.e., time points that are after the current time point. Each agent state identifies at least a waypoint location for the corresponding time point, i.e., identifies a location of the agent at the corresponding time point. In some implementations, each agent state also includes other information about the state of the agent at the corresponding time point, e.g., the predicted heading of the agent at the corresponding time point.

Each conditional behavior prediction generated by the system defines a conditional probability distribution over a space of possible future trajectories for the target agent given that the query agent follows the planned future trajectory for the query agent starting from the current time point.

In some implementations, the data characterizing trajectories of the plurality of agents can include the past states of the agents, including, for example, (x, y, z) positions and one or more of velocity vectors, acceleration vectors, orientation angles, and/or angular velocities. In some implementations, for each vehicle, the data can also include binary flags indicating features of the vehicle, e.g., whether the vehicle is signaling to turn left, signaling to turn right, and whether it is parked.

In some implementations, the context data 110 further includes road network information of the environment, including, for example, lane markings, lane boundaries, stop lines, and/or traffic light information, and so on. In one example, the context data includes points of lane markings and boundaries sampled around each agent.

To generate the conditional trajectory prediction 140 for each target agent 112B, the system processes the context data 110 and the planned future trajectory data 120 using a trajectory prediction neural network 130 (referred to as a first neural network in this specification for convenience), to generate data that defines a conditional probability distribution over possible future trajectories of the target agent after the current time point given that the query agent follows the planned future trajectory for the query agent after the current time point.

In some implementations, the conditional trajectory prediction 140 includes, for each target agent in the set, a respective score for each possible future trajectory in a discrete set of possible future trajectories that represents a likelihood that the possible future trajectory will be followed by the target agent given that the query agent follows the planned future trajectory for the query agent. Each possible future trajectory in the discrete set can identify a respective future waypoint location of the target agent at each of a plurality of future time steps. In some of these implementations and for each target agent in the set, the conditional trajectory prediction output can further include, for each of the possible future trajectories and for each of the plurality of future time steps, parameters of an uncertainty distribution over the future waypoint location of the target agent at the future time step given that the target agent takes the possible future trajectory starting from the current time point.

In some implementations, the first neural network 130 includes a context data encoder neural network 132, a trajectory encoder neural network 134, and a decoder neural network 136. The context data encoder neural network 132 is configured to, for each target agent 112B, process the context data to generate an embedding of the context data for the target agent. The trajectory encoder neural network 134 is configured to, for each target agent 112B, process the planned future trajectory to generate an embedding of the planned future trajectory of the query agent. The decoder neural network 136 is configured to, for each target agent, process (i) the embedding of the context data for the target agent and (ii) the embedding of the planned future trajectory for the target agent to generate the conditional trajectory prediction for the target agent.

An example of the first neural network 130 is described in detail with reference to FIG. 1C. In general, the trajectory encoder neural network 134 is configured to, for each target agent, transform the planned future trajectory for the query agent into an ego-centric coordinate system with respect to the target agent and process the transformed planned trajectory to generate the embedding of the planned future trajectory. The context data encoder neural network 132 can be configured to, for each target agent, transform the context data into an ego-centric coordinate system with respect to the target agent and process the transformed context data to generate the embedding of the context data.

In some implementations, the first neural network 130 further includes a graph neural network 138. The graph neural network is configured to receive features of a graph that has nodes representing the target agents and edges representing relationships between the target agents, and processes the features to generate a respective updated embedding for each of the target agents. The features of the input graph include, for each node in the graph, the embedding of the context data for the target agent represented by the node, the embedding of the planned trajectory for the target agent represented by the node, and the conditional trajectory prediction output for the target agent represented by the node. In this configuration, the first neural network is configured to process the respective updated embeddings of each of the target agents using the decoder neural network to update the conditional trajectory predictions for the target agents. In some implementations, for each target agent, the node representing the target agent is connected by a respective edge to the nodes representing the other target agents that are closest to the target agent in the environment at the current time point. In some implementations, the system 100 includes a fixed number (e.g., N=5) of neighboring agents that are nearest to the particular target agent in the graph representation. The system can process the features to generate a respective updated embedding for each of the target agents by computing edge features for each edge in the graph from at least the features of the nodes connected to the edge, and applying an attention-based aggregation function to combine the edge features.

In one example, a future trajectory s for an agent is defined as $s=\{s_1, \ldots, s_T\}$, which is a time discretized sequence of states for future time points $t \in \{1, \ldots, T\}$. The planned future trajectory for the query agent (e.g., agent A) is denoted by $s^A$. $s^A$ can be a specific realization of the distribution of future trajectories $S^A$ for agent A. The trajectory prediction neural network receives as input a realization of the future trajectory of the query agent, $s^A=[s_1^A, \ldots, s_T^A]$, and generates as the conditional trajectory prediction output that defines $p(\hat{S}^B|S^A=s^A, x)$, the distribution of future trajectories for agent B conditioned on $s^A$. Here, x represents observations from the environment, including past trajectories of all agents, and context information such as lane semantics.

In some implementations, the conditional trajectory prediction output includes a set of K trajectories for agent B, $\hat{\mu}^B=\{\hat{\mu}^{Bk}\}_{k=1}^{K}$, where each trajectory is a sequence of states $\hat{\mu}^{Bk}=\{\hat{\mu}_1^{Bk}, \ldots, \hat{\mu}_T^{Bk}\}$, capturing K potentially-different intended trajectories for agent B.

In some implementations, the system can predict uncertainty over the K intended trajectories as a softmax distribution $\hat{\pi}^{Bk}(x, s^A)$. The model can also predict Gaussian uncertainty over the positions of trajectory waypoints as:

$$\hat{\phi}^{Bk}<(\hat{s}_t^B|x,s^A)= \mathcal{N}(\hat{s}_t^B|\hat{\mu}_t^{Bk}(x,s^A),\hat{\Sigma}_t^{Bk}(x,s^A)). \tag{1}$$

The system can generate the full conditional distribution $p(\hat{S}^B|s^A,x)$ as a Gaussian Mixture Model (GMM) with mixture weights fixed over all time steps of the same trajectory:

$$p(\hat{S}^B=\hat{s}^B|x,s^A)=\Sigma_{k=1}^{K}\hat{\pi}^{Bk}(x,s^A)\Pi_{t=1}^{T}\hat{\phi}^{Bk}(\hat{s}_t^B|X,s^A). \tag{2}$$

The softmax distribution can be computed as $$\hat{\pi}^{Bk}(x, s^A) = \frac{\exp \hat{f}_k^B(x, s^A)}{\sum_i \exp \hat{f}_i^B(x, s^A)}.$$

The system can predict the parameters $\hat{f}_k^B$, $\hat{\mu}_t^{Bk}$ and $\hat{\Sigma}_t^{Bk}$ sing a neural network, e.g., the first neural network.

In some implementations, the system 100 also generates a marginal trajectory prediction 150 for each target agent. Concretely, for each of the one or more target agents 112B, the system 100 processes the context data 110 using a neural network (referred to as a second neural network in this specification for convenience) to generate a marginal trajectory prediction output that defines a marginal probability distribution over possible future trajectories of the target 112B after the current time point without conditioning on the planned future trajectory for the query agent.

In some implementations, the system uses the same neural network that generates the conditional trajectory predictions, i.e., the first neural network 130, to generate the marginal trajectory prediction. That is, the second neural network is the same neural network as the first neural network. By using the same trained neural network to produce both the conditional and the marginal predictions, the system 100 can potentially reduce the impact of training noise on the differences between marginal and conditional predictions.

To generate the marginal trajectory prediction 150, the system 100 can process the context data and a pre-determined, default planned trajectory using the first neural network 130 to generate the marginal trajectory prediction 150. For example, the first neural network 150 can include the context data encoder neural network 152, the trajectory encoder neural network 154, the decoder neural network 156, and the graph neural network 160, and the system can set an output of the planned trajectory encoder to a pre-determined, default embedding during the processing of the context data.

In one example, the system estimates the marginal probability distribution $p(S^B|x)$ for agent B, where $p(S^B|x)$ is not conditioned on any future plan for A. The marginal probability prediction can be computed based on parameters $\hat{f}_k^B(x)$, $\hat{\mu}_t^{Bk}(x)$, and $\hat{\Sigma}_t^{Bk}(x)$ generated by a neural network, e.g., the second neural network. Given intent, the distribution over agent B's future trajectories $\tilde{s}_t^B$ can be represented as $$\hat{\phi}^{Bk}(\tilde{s}_t^B|x) = \mathcal{N}(\tilde{s}_t^B|\tilde{\mu}_t^{Bk}(x), \tilde{\Sigma}_t^{Bk}(x)). \quad (3)$$

The full marginal distribution $p(S^B|x)$ over all potential intents for the agent B is given by $$p(\tilde{S}^B = s^B|x) = \Sigma_{k=1}^K \tilde{\pi}^{Bk}(x) \Pi_{t=1}^T \tilde{\phi}^{Bk}(\tilde{s}_t^B|x), \quad (4)$$

where $$\tilde{\pi}^{Bk}(x) = \frac{\exp \tilde{f}_k^B(x)}{\sum_i \exp \tilde{f}_i^B(x)}.$$

The system 100 can further include an interactivity characterization engine 160 that determines a respective interactivity score 170 for each target agent 112B. In general, the interactivity score characterizes the degree to which the query agent's behavior changes the predicted distribution of the corresponding target agent.

In some implementations, the system 100 can use the interactivity score to guide the trajectory planning of the query agent, for example, by allocating computational resources for controlling the query agent starting from the current time point based on the respective interactivity scores for the target agents.

For example, when the environment includes multiple target agents, the system 100 can generate a respective interactivity score between the query agent and each of the target agents and can then allocate computational resources available for planning the future trajectory of the query agent, e.g., computational resources available onboard the autonomous vehicle, based on the interactivity scores.

For example, the system 100 can make high-fidelity (and compute-intensive) behavior predictions only for target agents that have interactivity scores above a threshold or only for the target agents that have the top k interactivity scores. The system can then use a lower-fidelity trajectory prediction system for the remaining agents.

Optionally, the system 100 can combine the interactivity scores with other factors, e.g., outputs of other models or heuristics such as distance, to generate a final interactivity score and then allocate resources based on the final scores.

Because the interactivity scores 170 are representative of likelihoods that the behavior of the query agent (e.g., the autonomous vehicle) will affect the corresponding agents, the system can reduce the amount of computational resources that are consumed by generating behavior predictions for surrounding agents without adversely impacting the quality of the final planned trajectory that is generated using the generated behavior predictions. In fact, in some cases, by causing the system to focus the high-fidelity predictions on only the relevant target agents, the quality of the final planned trajectory can be improved.

In general, the conditional trajectory prediction 140 for the one or more target agents 112B and/or data derived from the conditional trajectory prediction outputs (e.g., the interactivity scores 170) can be used to guide the control of the query agent. For example, when the query agent 112A is an autonomous vehicle, the system 100 can provide (i) the conditional trajectory prediction outputs for the one or more target agents, (ii) data derived from the conditional trajectory prediction outputs for the one or more target agents, or (iii) both to an onboard system of the autonomous vehicle for use in controlling the autonomous vehicle. Similarly, when the query agent is a simulated autonomous vehicle in a computer simulation, the system 100 can provide (i) the conditional trajectory prediction outputs for the one or more target agents, and/or (ii) data derived from the conditional trajectory prediction outputs for the one or more target agents, for use in controlling the simulated autonomous vehicle in the computer simulation.

In some implementations, to determine the interactivity score 170, the interactivity characterization engine 160 determines an estimate of a divergence between the conditional probability distribution 140 and the marginal probability distribution 150 predicted for each target agent 112B.

In some implementations, to determine the estimate of the divergence, the interactivity characterization engine 160 samples a plurality of trajectories from the conditional probability distribution. The interactivity characterization engine 160 then determines, for each sampled trajectory, a ratio of (i) a probability assigned to the sampled trajectory by the conditional probability distribution to (ii) a probability assigned to the sampled trajectory by the marginal probability distribution. The system then determines the estimate from the ratios.

In some implementations, the interactivity characterization engine 160 adopts the Kullback-Leibler (KL) divergence (also termed the relative entropy), to compute the estimated divergence between the conditional and marginal distribution for the target agent's predicted future trajectory $S^B$ to quantify the influence exerted on agent B by a particular trajectory $s^A$:

$$D_{KL}[p(S^B|s^A)\|p(S^B)] = \int_{S^B} p(s^B|s^A)\log\frac{p(s^B|s^A)}{p(s^B)} \quad (5)$$

Figure 1B:
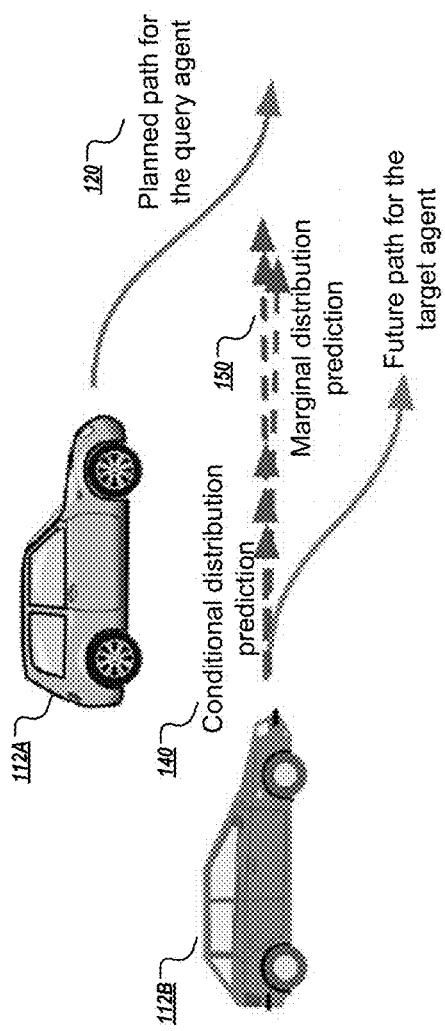
FIG. 1B illustrates an example of an interactivity scenario between a query agent and a target agent.

FIG. 1B illustrates an example of an interactivity scenario between a query agent 112A and a target agent 112B. If the query agent 112A (e.g., an autonomous vehicle driving on a road) is controlled to change lanes abruptly in front of the target agent 112B (e.g., another vehicle sharing the road with 112A), the target agent 112B will likely change behavior (e.g., by slowing down), as shown by the conditional trajectory distribution. In this case, the KL-divergence will reflect a significant change relative to the agent's marginal expected behavior in the target agent's expected behavior as a result of the query agent's planned lane change.

Referring back to FIG. 1A, the interactivity characterization engine 160 determines the interactivity score from at least the estimate of the divergence between the conditional probability distribution and the marginal probability distribution for each target agent.

In some implementations, to determine the respective interactivity score between the query agent 112A and a particular target agent 112B in the absence of a particular plan for the query agent or the target agent, the interactivity characterization engine 160 can take into account a set of possible trajectories for the query agent and compute the estimated divergence over all those possible trajectories. That is, the interactivity characterization engine 160 obtains (i) a plurality of possible planned future trajectories for the query agent that includes the planned future trajectory and (ii) a respective probability of occurrence for each of the plurality of planned future trajectories. The interactivity characterization engine 160 then determines, for each of the plurality of possible planned future trajectories, a respective estimate of a divergence between (i) a conditional probability distribution for the target agent conditioned on the possible planned future trajectory and (ii) the nominal probability distribution for the target agent. The system then determines the interactivity score from the probabilities for the plurality of possible planned future trajectories and the estimates for the plurality of possible planned future trajectories.

In some implementations, to obtain the plurality of possible planned future trajectories for the query agent 112A and a respective probability of occurrence for each planned future trajectory, the interactivity characterization engine 160 uses the second neural network to generate the nominal trajectory prediction output for the query agent 112A, and determines the plurality of possible planned future trajectories for the query agent 112A and a respective probability of occurrence for each of the plurality of planned future trajectories using the nominal trajectory prediction output.

In one example, the possible future trajectories of agents A and B are represented by variables $S^A$ and $S^B$. The system computes the interactivity score of the two agents' future trajectories $S^A$ and $S^B$ as:

$$I(S^A, S^B) = \int_{S^A} p(s^A) D_{KL}[P(S^B|s^A)\|p(S^B)] \quad (6)$$

The interactivity score represents the dependence between the two random variables $S^A$ and $S^B$. It is non-negative, $I(S^A, S^B) \geq 0$, and symmetric, $I(S^A, S^B) = I(S^B, S^A)$.

In some implementations, the system approximates the marginal distributions by sampling N trajectories from the marginal distribution, $\tilde{s}_n^A \sim p(\tilde{S}^A|x)$, and computes the interactivity score as:

$$I(S^A, S^B|x) \approx \frac{1}{N}\sum_n D_{KL}[p(\hat{S}^B|\tilde{s}_n^A, x)\|p(\tilde{S}^B|x)] \quad (7)$$

The system can estimate the KL divergence between the marginal and conditional GMM distributions via Monte-Carlo sampling of $\hat{s}_m^B \sim p(\hat{S}^B|\tilde{s}_n^A, x)$, as:

$$D_{KL}[p(\hat{S}^B|\tilde{s}^A, x)\|p(\tilde{S}^B|x)] \approx \frac{1}{M}\sum_m \log\frac{p(\hat{S}^B = \hat{s}_m^B|\tilde{s}_n^A, x)}{p(\tilde{S}^B = \hat{s}_m^B|x)} \quad (8)$$

This estimate needs to be evaluated for each $\tilde{s}_n^A$, requiring N inference steps of the conditional model. Instead, in some implementations, the system can estimate the outer expectation via importance sampling. That is, rather than sampling N samples from the marginal distribution, the system can use the K modes of the marginal distribution's GMM in Eq. (4), with $\tilde{s}_k^A \in \{\hat{\mu}^{kA}\}_{k=1}^K$:

$$I(S^A, S^B|x) \approx \frac{1}{M}\sum_k \sum_m p(\tilde{s}_k^A|x)\log\frac{p(\hat{S}^B = \hat{s}_m^B|\tilde{s}_k^A, x)}{p(\tilde{S}^B = \hat{s}_m^B|x)} \quad (9)$$

where the marginal and conditional probabilities are evaluated via Eqs. (4) and (2).

In order to cause the neural network 130 to make accurate trajectory predictions, the system 100 or another system trains the trajectory prediction neural network 130 using training data including a plurality of training examples. For example, for predicting trajectories of agents (e.g., vehicles, pedestrians, and cyclists) in an interactive driving environment, the system can use datasets of logged driving data to train the trajectory prediction neural network via end-to-end supervised learning. For example, the logged driving data can include driving sequences of autonomous vehicles.

In one example, to train the model for conditional prediction, the system can set the conditional query/plan input to agent A's ground-truth future trajectory from the training dataset. The system can further train the model for marginal predictions by setting the conditional query/plan to a zero vector $s^A = 0$. Therefore, marginal prediction can be obtained via $\tilde{f}_k^B(x) := \hat{f}_k^B(x, 0)$, $\tilde{\mu}_t^{Bk}(x) := \hat{\mu}_t^{Bk}(x, 0)$, and $\tilde{\Sigma}_t^{Bk}(x) := \hat{\Sigma}_t^{Bk}(x, 0)$. During training, the system can select a portion of (e.g., 95%) of examples to include conditional queries and use the other (e.g., 5%) of examples as marginal query examples.

The system can train the trajectory prediction neural network to predict the distribution parameters $\hat{f}_k^B(x, s^A)$, $\hat{\mu}_t^{Bk}(x, s^A)$, and $\Sigma_t^{Bk}(x, 0)$ $(x, s^A)$ via supervised learning using the negative log-likelihood loss, $$\mathcal{L}_o(\theta) = \sum_{m=2}^{M} \sum_{k=1}^{M} \mathbb{1}(k = k_m^0) \left[ \log \hat{\pi}^{BK}(x_M, s_M^A; \theta) + \sum_{t=1}^{T} \log \mathcal{N}(s_t^{Bk} | \hat{\mu}_t^{Bk}, \hat{\Sigma}_t^{Bk}; x_m, s_m^A; \theta) \right], \quad (10)$$

where $k_m$ is the index of the mode of the distribution that has the closest endpoint to the given ground-truth trajectory, $k_m^B = \arg\min_k \Sigma_{t=1}^T \|s_t^{Bk} - \hat{\mu}_t^{Bk}\|_2$.

In some implementations, instead of producing predictions for a single target agent B, the trajectory prediction neural network is trained to generate predictions for multiple target agents in parallel. This increases the computational efficiency for the system to make trajectory predictions for multiple target agents in the environment. In particular, the conditional trajectory prediction model can be configured to process data for each of the multiple agents in parallel in a batch dimension. For a particular target agent B, the system can transform the scene context into a coordinate system centered on the target agent B, and predict agent B's future trajectory distributions as a set of trajectories in agent B's coordinate system. The system can further transform the output trajectories for the multiple target agents back into the global coordinate system for the environment. In order to take into account the fundamental physical property that the agents cannot occupy the same future location in space-time, the system can include an additional loss term, $$\mathcal{O}_{(A,B)} = \Sigma\Sigma \hat{\pi}^{Ai} \hat{\pi}^{Bj} \max_t \mathbb{1}(\|\hat{\mu}_t^{Ai} - \hat{\mu}_t^{Bj}\|_2^2 < \alpha), \quad (11)$$

where $\{(\hat{\pi}^{Ai}, \hat{\mu}^{Ai})\}_{i=1}^K$ and $\{(\hat{\pi}^{Bj}, \hat{\mu}^{Bj})\}_{j=1}^K$ are the modes and probabilities of the future trajectory distributions for agents A and B. In some implementations, the constraint, $\|\bullet\| < \alpha$, can be relaxed to obtain a differentiable loss term:

$$\mathcal{L}_o(A, B) = \sum_i \sum_j \hat{\pi}^{Ai} \hat{\pi}^{Bj} \max_t \exp\left(-\frac{\|\hat{\mu}_t^{Ai} - \hat{\mu}_t^{Bj}\|_2^2}{\alpha}\right). \quad (12)$$

Figure 1C:
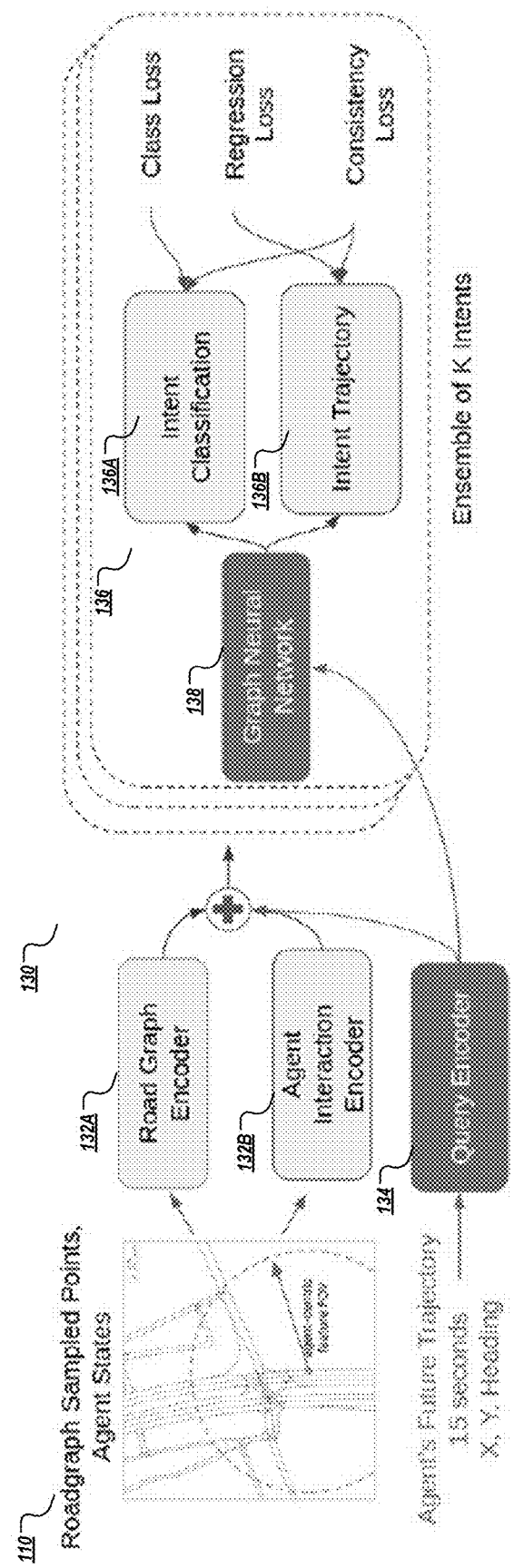
FIG. 1C shows an example process of performing conditional behavior prediction.

FIG. 1C shows an example of the trajectory prediction neural network 130. The trajectory prediction neural network 130 includes the query encoder 134 for encoding the query agent's planned future trajectory for each target agent and a decoder neural network that includes the graph neural network 138 for updating embeddings for each target agent. The context data encoder can include a road graph encoder 132A for encoding road features and an agent interaction encoder 132B for encoding agent past trajectories.

In one example, the road graph encoder 132A samples road features (such as lanes, traffic lights, stop lines) at specified intervals (e.g., at 1 m intervals) around each agent, to obtain sampled points for these features. The road graph encoder can transform these points into each agent's reference frame, and processes them via a neural network, such as a multi-layer perceptron (MLP). The road graph encoder 132A can then aggregate the variable number of points via max-pooling to obtain a fixed size encoded vector to describe the road graph around each agent.

In one example, the agent interaction encoder 132B receives a sequence of past state observations (e.g., for a 2 s period until a current time point sampled at 10 Hz). The agent interaction encoder 132B can encode the time series of state vectors with a recurrent neural network (e.g., an LSTM). The agent interaction encoder 132B can take into account agent interactions by treating each agent as an ego-agent. That is, for each particular agent, the encoder 132B can transform the state vector sequences of the other agents into the coordinate frame of the particular agent. The encoder can then encode the transformed sequences, e.g., via an MLP. The encoder 132B can then aggregate the neighbor encodings with a max-pool operation to obtain a single encoding summarizing all interactions with neighboring agents.

Similarly, in one example of the query encoder 134, the query encoder 134 can encode the conditional query trajectory using an MLP. The query is encoded for each of the target agents in the scene, in their respective coordinate frame.

The system can combine (e.g., concatenate) the encoded embeddings outputted from the encoders 132A, 132B, and 134, and decode the combined embeddings into trajectories and likelihoods using the decoder neural network 136. In some implementations, the decoding process can be performed iteratively by the graph neural network 138.

In one example, the system computes trajectory likelihood scores using a classification head 136A (e.g., a neural network with a fully-connected ResNet architecture) followed by a softmax output. The system further regresses the trajectory coordinates of the predicted trajectories into a polynomial using an intent trajectory head 136B (e.g., a neural network having ResNet blocks for each of the x and y spatial dimensions).

The graph neural network 138 can receive the embeddings, the decoded trajectories, and the decoded likelihoods for each agent as node features. An example of the graph neural network architecture is the SpaGNN neural network described in "Spatially-aware graph neural networks for relational behavior forecasting from sensor data," arXiv: 1910.08233, 2019. The input graph can be constructed using every predicted agent as a node in the graph, and each node is connected to those corresponding neighboring agents (e.g., the five nearest agents). The graph neural network 138 can use an attention-based aggregation function that combines the edge features to form messages passed to each node.

In each of a plurality of iterations in the decoding process, the system can apply one message update in the graph neural network to pass trajectory information between neighboring agents, and then apply trajectory decoding. This process can refine the agents' trajectory distributions with awareness of their neighbors' distributions.

Figure 2A:
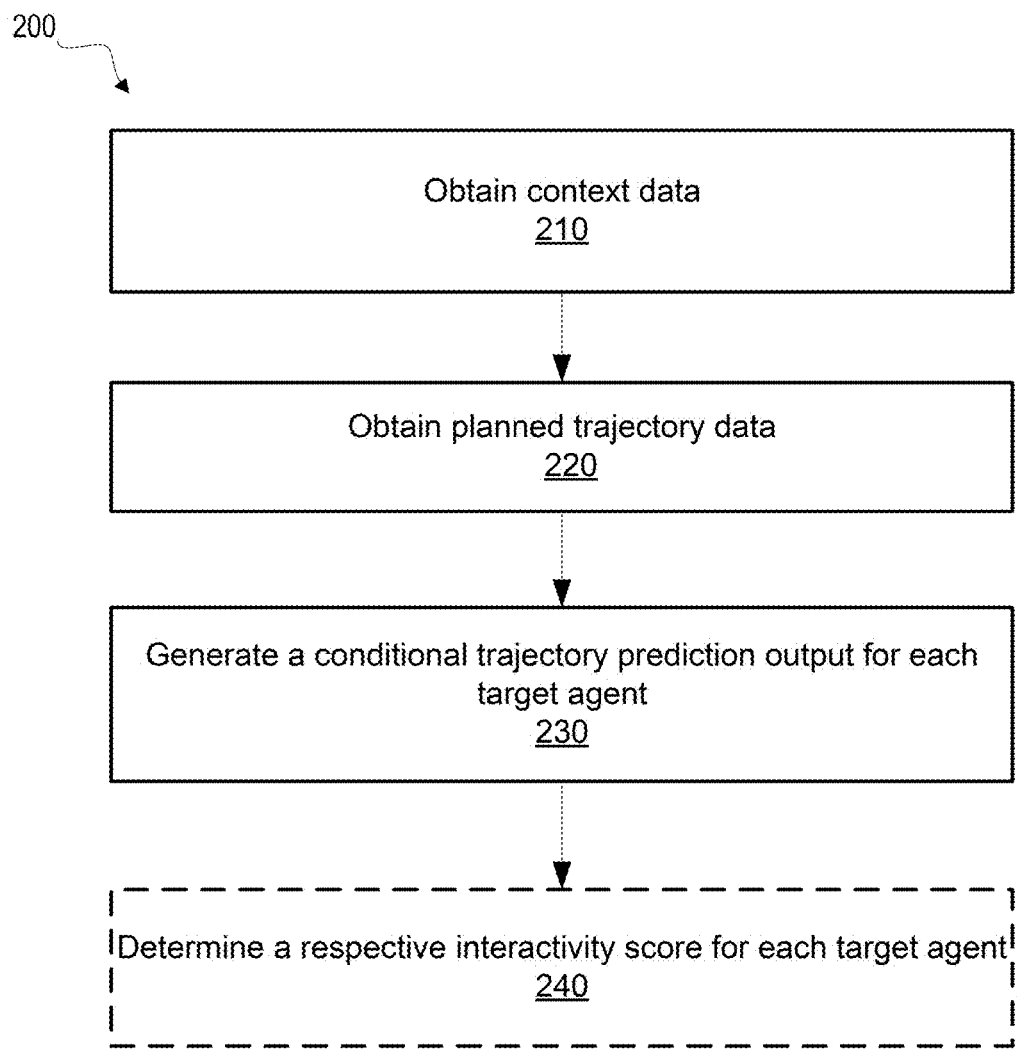
FIG. 2A is a flow diagram illustrating an example process for performing conditional behavior prediction.

FIG. 2A is a flow diagram illustrating an example process 200 for performing a conditional behavior prediction. For convenience, the process 200 will be described as being performed by a system of one or more computers located in one or more locations. For example, a conditional behavior prediction system, e.g., the conditional behavior prediction system 100 of FIG. 1A, appropriately programmed in accordance with this specification, can perform the process 200.

In step 210, the system obtains context data characterizing the environment. The context data includes data characterizing a plurality of agents, including a query agent and a set of one or more target agents, in the environment at a current time point. The context data includes data characterizing trajectories of each of the plurality of agents up to the current time point.

In one example, the query agent is an autonomous vehicle navigating through the environment. Each target agent in the set is an agent in a vicinity of the autonomous vehicle in the environment. The context data includes data generated from data captured by one or more sensors, such as cameras and/or Lidar sensors, of the autonomous vehicle.

In another example, the query agent is a simulated autonomous vehicle navigating through a computer simulation of a real-world environment. Each target agent in the set is a simulated agent in a vicinity of the simulated autonomous vehicle in the computer simulation. The context data includes data generated from data that simulates data that would be captured by one or more sensors of an autonomous vehicle in the real-world environment.

In some implementations, the data characterizing trajectories of the plurality of agents can include the past states of the agents, including, for example, (x, y, z) positions, and one or more of, velocity vectors, acceleration vectors, orientation angles, and/or angular velocities. In some implementations, for each vehicle, the data can also include binary flags indicating features such as whether the vehicle is signaling to turn left, signaling to turn right, and whether it is parked.

In some implementations, the context data further includes road network information of the environment, including, for example, lane markings, lane boundaries, stop lines, and/or traffic light information, and so on. In one example, the context data includes points of lane markings and boundaries sampled around each agent.

In step 220, the system obtains planned trajectory data for the query agent. The planned trajectory data identifies a planned future trajectory for the query agent after the current time point.

For example, the query agent can be an autonomous vehicle navigating through the environment, and the planned future trajectory can be generated by the onboard system of the autonomous vehicle.

In step 230, the system generates a conditional trajectory prediction output for each target agent. Concretely, for each target agent in the set, the system processes the context data and the data identifying the planned future trajectory using a trajectory prediction neural network (referred to as a first neural network in this specification for convenience), to generate a conditional trajectory prediction output that defines a conditional probability distribution over possible future trajectories of the target agent after the current time point given that the query agent follows the planned future trajectory for the query agent after the current time point.

In some implementations, the conditional trajectory prediction output includes, for each target agent in the set, a respective score for each possible future trajectory in a discrete set of possible future trajectories that represents a likelihood that the possible future trajectory will be followed by the target agent given that the query agent follows the planned future trajectory for the query agent. Each possible future trajectory in the discrete set can identify a respective future waypoint location of the target agent at each of a plurality of future time steps, and for each target agent in the set, the conditional trajectory prediction output can further include, for each of the possible future trajectories and for each of the plurality of future time steps, parameters of an uncertainty distribution over the future waypoint location of the target agent at the future time step given that the target agent takes the possible future trajectory starting from the current time point.

In some implementations, the first neural network includes a context data encoder neural network, a trajectory encoder neural network, and a decoder neural network. The context data encoder neural network is configured to, for each target agent, process the context data to generate an embedding of the context data for the target agent. The trajectory encoder neural network is configured to, for each target agent, process the planned future trajectory to generate an embedding of the planned future trajectory of the query agent. The decoder neural network is configured to, for each target agent, process (i) the embedding of the context data for the target agent and (ii) the embedding of the planned future trajectory for the target agent to generate the conditional trajectory prediction for the target agent.

In some implementations, the trajectory encoder neural network is configured to, for each target agent, transform the planned future trajectory into an ego-centric coordinate system with respect to the target agent and process the transformed planned trajectory to generate the embedding of the planned future trajectory. The context data encoder neural network can be configured to, for each target agent, transform the context data into an ego-centric coordinate system with respect to the target agent and process the transformed context data to generate the embedding of the context data.

In some implementations, the first neural network further includes a graph neural network. The graph neural network is configured to receive features of a graph that has nodes representing the target agents and edges representing relationships between the target agents, and processes the features to generate a respective updated embedding for each of the target agents. The features of the input graph include, for each node in the graph, the embedding of the context data for the target agent represented by the node, the embedding of the planned trajectory for the target agent represented by the node, and the conditional trajectory prediction output for the target agent represented by the node. In this configuration, the first neural network is configured to process the respective updated embeddings of each of the target agents using the decoder neural network to update the conditional trajectory predictions for the target agents. In some implementations, for each target agent, the node representing the target agent is connected by a respective edge to the nodes representing the other target agents that are closest to the target agent in the environment at the current time point. The system can process the features to generate a respective updated embedding for each of the target agents by computing edge features for each edge in the graph from at least the features of the nodes connected to the edge, and applying an attention-based aggregation function to combine the edge features.

Optionally, in step 240, the system determines a respective interactivity score for each target agent. In general, the interactivity score characterizes the degree to which the query agent's behavior changes the predicted distribution of the corresponding target agent.

In some implementations, the system can use the interactivity score to guide the trajectory planning of the query agent, for example, by allocating computational resources for controlling the query agent starting from the current time point based on the respective interactivity scores for the target agents.

Figure 2B:
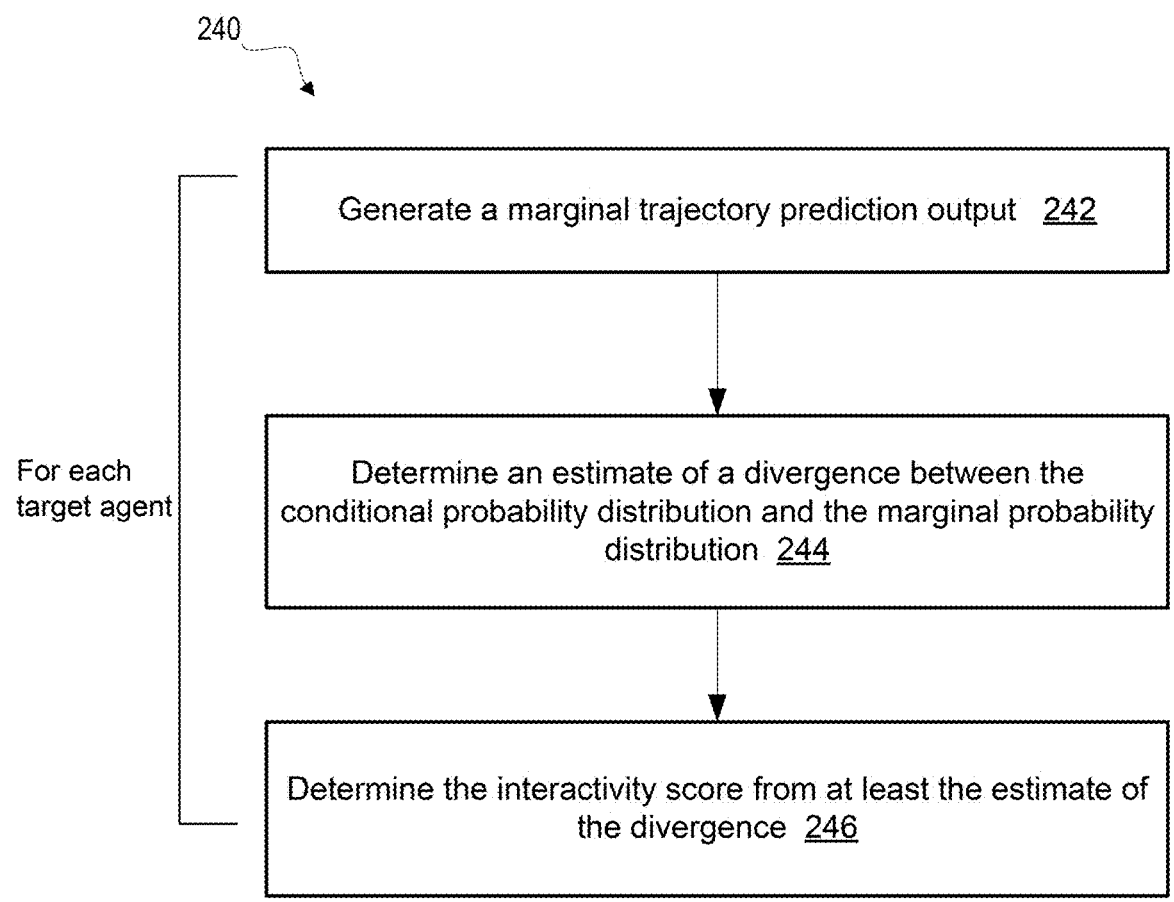
FIG. 2B is a flow diagram illustrating an example process for determining the respective interactivity score for each target agent.

FIG. 2B is a flow diagram illustrating an example process 240 for determining the respective interactivity score for each target agent. For convenience, the process 240 will be described as being performed by a system of one or more computers located in one or more locations. For example, a conditional behavior prediction system, e.g., the conditional behavior prediction system 100 of FIG. 1A, appropriately programmed in accordance with this specification, can perform the process 240.

In step 242, the system generates a marginal trajectory prediction output for each target agent. Concretely, for each of the one or more target agents, the system processes the context data using a neural network (referred to as a second neural network in this specification for convenience) to generate a marginal trajectory prediction output that defines a marginal probability distribution over possible future trajectories of the target after the current time point without conditioning on the planned future trajectory for the query agent.

In some implementations, the system uses the same neural network that generates the conditional trajectory predictions, i.e., the first neural network, to generate the marginal trajectory prediction. That is, the second neural network is the same neural network as the first neural network. By using the same trained neural network to produce both the conditional and the marginal predictions, the system can potentially reduce the impact of training noise on the differences between marginal and conditional predictions.

To generate the marginal trajectory prediction output, the system can process the context data and a pre-determined, default planned trajectory using the first neural network to generate the marginal trajectory prediction output. For example, the first neural network can include the context data encoder neural network, the trajectory encoder neural network, the decoder neural network, and the graph neural network, and the system can set an output of the planned trajectory encoder to a pre-determined, default embedding during the processing of the context data.

In step 244, the system determines an estimate of a divergence between the conditional probability distribution and the marginal probability distribution for each target agent.

In some implementations, to determine the estimate of the divergence, the system samples a plurality of trajectories from the conditional probability distribution. The system then determines, for each sampled trajectory, a ratio of (i) a probability assigned to the sampled trajectory by the conditional probability distribution to (ii) a probability assigned to the sampled trajectory by the marginal probability distribution. The system then determines the estimate from the ratios.

In step 246, the system determines the interactivity score from at least the estimate of the divergence between the conditional probability distribution and the marginal probability distribution for each target agent.

In some implementations, to determine the respective interactivity score between the query agent and a specific target agent in the absence of a particular plan for the query agent or the target agent, the system can take into account a set of possible trajectories for the query agent and compute the estimated divergence over all those possible trajectories. That is, the system obtains (i) a plurality of possible planned future trajectories for the query agent that includes the planned future trajectory and (ii) a respective probability of occurrence for each of the plurality of planned future trajectories. The system then determines, for each of the plurality of possible planned future trajectories, a respective estimate of a divergence between (i) a conditional probability distribution for the target agent conditioned on the possible planned future trajectory and (ii) the nominal probability distribution for the target agent. The system then determines the interactivity score from the probabilities for the plurality of possible planned future trajectories and the estimates for the plurality of possible planned future trajectories.

In some implementations, to obtain the plurality of possible planned future trajectories for the query agent and a respective probability of occurrence for each planned future trajectory, the system uses the second neural network to generate a nominal trajectory prediction output for the query agent, and determines the plurality of possible planned future trajectories for the query agent and a respective probability of occurrence for each of the plurality of planned future trajectories using the nominal trajectory prediction output.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining context data characterizing an environment, the context data comprising data characterizing a plurality of agents in the environment at a current time point, the plurality of agents comprising a query agent and a set of one or more target agents, and the context data comprising data characterizing trajectories of each of the plurality of agents up to the current time point;
    obtaining data identifying a planned future trajectory for the query agent after the current time point; and
    for each target agent in the set, processing the context data and the data identifying the planned future trajectory using a first neural network to generate a conditional trajectory prediction output that defines a conditional probability distribution over possible future trajectories of the target agent after the current time point given that the query agent follows the planned future trajectory for the query agent after the current time point.

2. The method of claim 1, wherein:
    the query agent is an autonomous vehicle navigating through the environment,
    each target agent in the set is an agent in a vicinity of the autonomous vehicle in the environment, and
    the context data comprises data generated from data captured by one or more sensors of the autonomous vehicle.

3. The method of claim 1, wherein the conditional trajectory prediction output comprises, for each target agent in the set, a respective score for each possible future trajectory in a discrete set of possible future trajectories that represents a likelihood that the possible future trajectory will be followed by the target agent given that the query agent follows the planned future trajectory for the query agent.

4. The method of claim 3, wherein:
    each possible future trajectory in the discrete set identifies a respective future waypoint location of the target agent at each of a plurality of future time steps, and
    for each target agent in the set, the conditional trajectory prediction output further comprises, for each of the possible future trajectories and for each of the plurality of future time steps, parameters of an uncertainty distribution over the future waypoint location of the target agent at the future time step given that the target agent takes the possible future trajectory starting from the current time point.

5. The method of claim 1, wherein the first neural network comprises:
a context data encoder neural network that is configured to, for each target agent, process the context data to generate an embedding of the context data for the target agent;
a trajectory encoder neural network that is configured to, for each target agent, process the planned future trajectory to generate an embedding of the planned future trajectory for the target agent; and
a decoder neural network that is configured to, for each target agent, process (i) the embedding of the context data for the target agent and (ii) the embedding of the planned future trajectory for the target agent to generate the conditional trajectory prediction for the target agent.

6. The method of claim 5, wherein the trajectory encoder neural network is configured to, for each target agent, transform the planned future trajectory into an ego-centric coordinate system with respect to the target agent and process the transformed planned trajectory to generate the embedding of the planned future trajectory.

7. The method of claim 5, wherein the context data encoder neural network is configured to, for each target agent, transform the context data into an ego-centric coordinate system with respect to the target agent and process the transformed context data to generate the embedding of the context data.

8. The method of any one of claim 5, wherein the first neural network further comprises:
a graph neural network that is configured to:
receive features of a graph that has nodes representing the target agents and edges representing relationships between the target agents, wherein the features of the graph comprise, for each node in the graph, the embedding of the context data for the target agent represented by the node, the embedding of the planned trajectory for the target agent represented by the node, and the conditional behavior prediction output for the target agent represented by the node; and
processes the features to generate a respective updated embedding for each of the target agents, and wherein the first neural network is configured to:
process the respective updated embeddings of each of the target agents using the decoder neural network to update the conditional trajectory predictions for the target agents.

9. The method of claim 8, wherein, for each target agent, the node representing the target agent is connected by a respective edge to the nodes representing the other target agents that are closest to the target agent in the environment at the current time point.

10. The method of claim 8, wherein processing the features to generate a respective updated embedding for each of the target agents comprises:
computing edge features for each edge in the graph from at least the features of the nodes connected to the edge; and
applying an attention-based aggregation function to combine the edge features.

11. The method of claim 1, further comprising:
for each of the one or more target agents, processing the context data using a second neural network to generate a marginal trajectory prediction output that defines a marginal probability distribution over possible future trajectories of the target after the current time point without conditioning on the planned future trajectory for the query agent.

12. The method of claim 11, wherein the first neural network is the same neural network as the second neural network.

13. The method of any one of claim 12, further comprising:
generating, for each of the target agents, a respective interactivity score from at least the conditional trajectory prediction output and the marginal trajectory prediction output for the target agent.

14. The method of claim 13, further comprising:
allocating computational resources for controlling the query agent starting from the current time point based on the respective interactivity scores for the target agents.

15. The method of claim 13, wherein generating the respective interactivity score comprises determining, using the conditional trajectory prediction output and the marginal trajectory prediction output for the target agent, an estimate of a divergence between the conditional probability distribution and the marginal probability distribution for the target agent.

16. The method of claim 15, wherein estimating the divergence comprises:
sampling a plurality of trajectories from the conditional probability distribution;
determining, for each sampled trajectory, a ratio of (i) a probability assigned to the sampled trajectory by the conditional probability distribution to (ii) a probability assigned to the sampled trajectory by the marginal probability distribution; and
determining the estimate from the ratios.

17. The method of claim 15, wherein generating the respective interactivity score comprises:
obtaining (i) a plurality of possible planned future trajectories for the query agent that includes the planned future trajectory and (ii) a respective probability of occurrence for each of the plurality of planned future trajectories;
determining, for each of the plurality of possible planned future trajectories, a respective estimate of a divergence between (i) a conditional probability distribution for the target agent conditioned on the possible planned future trajectory and (ii) the marginal probability distribution for the target agent; and
determining the interactivity score from the probabilities for the plurality of possible planned future trajectories and the estimates for the plurality of possible planned future trajectories.

18. The method of claim 1 wherein the context data comprises road network information and agent trajectory information for the plurality of agents.

19. A system comprising:
one or more computers; and
one or more storage devices storing instructions that, when executed by the one or more computers, cause the one or more computers to perform:
obtaining context data characterizing an environment, the context data comprising data characterizing a plurality of agents in the environment at a current time point, the plurality of agents comprising a query agent and a set of one or more target agents, and the context data comprising data characterizing trajectories of each of the plurality of agents up to the current time point;

obtaining data identifying a planned future trajectory for the query agent after the current time point; and for each target agent in the set, processing the context data and the data identifying the planned future trajectory using a first neural network to generate a conditional trajectory prediction output that defines a conditional probability distribution over possible future trajectories of the target agent after the current time point given that the query agent follows the planned future trajectory for the query agent after the current time point.

20. One or more computer-readable storage media storing instructions that when executed by one or more computers cause the one or more computers to perform:

obtaining context data characterizing an environment, the context data comprising data characterizing a plurality of agents in the environment at a current time point, the plurality of agents comprising a query agent and a set of one or more target agents, and the context data comprising data characterizing trajectories of each of the plurality of agents up to the current time point;

obtaining data identifying a planned future trajectory for the query agent after the current time point; and for each target agent in the set, processing the context data and the data identifying the planned future trajectory using a first neural network to generate a conditional trajectory prediction output that defines a conditional probability distribution over possible future trajectories of the target agent after the current time point given that the query agent follows the planned future trajectory for the query agent after the current time point.

\* \* \* \* \*